(12) United States Patent
Santoianni et al.

(10) Patent No.: US 9,222,026 B2
(45) Date of Patent: Dec. 29, 2015

(54) PLASMA GASIFICATION REACTORS WITH MODIFIED CARBON BEDS AND REDUCED COKE REQUIREMENTS

(71) Applicant: Alter NRG Corp., Calgary (CA)

(72) Inventors: James Santoianni, Greensburg, PA (US); Michael Erskine Heier, Cochrane (CA); Aleksandr Gorodetsky, Calgary (CA); Stephanie Reese, Cranbery Township, PA (US); Kent O. Hicks, Calgary (CA)

(73) Assignee: Alter NRG Corp., Calgary, Alberta (CA)

( * ) Notice: Subject to any disclaimer, the term of this patent is extended or adjusted under 35 U.S.C. 154(b) by 21 days.

(21) Appl. No.: 13/803,107

(22) Filed: Mar. 14, 2013

(65) Prior Publication Data

US 2013/0192970 A1    Aug. 1, 2013

Related U.S. Application Data

(62) Division of application No. 13/199,814, filed on Sep. 9, 2011.

(60) Provisional application No. 61/403,123, filed on Sep. 11, 2010.

(51) Int. Cl.
*C01B 31/02* (2006.01)
*C10B 53/08* (2006.01)
(Continued)

(52) U.S. Cl.
CPC .............. *C10B 53/08* (2013.01); *C04B 28/04* (2013.01); *C10J 3/02* (2013.01); *C10J 3/18* (2013.01);
(Continued)

(58) Field of Classification Search
CPC .................................. C04B 28/04; C10J 3/18
USPC .......................................... 423/454; 252/373
See application file for complete search history.

(56) References Cited

U.S. PATENT DOCUMENTS 3,779,182 A    12/1973  Camacho
4,130,416 A    12/1978  Zaboronok et al.
(Continued)

FOREIGN PATENT DOCUMENTS

GB    2116201 A    9/1983
WO    03018721 A1    3/2003
(Continued)

*Primary Examiner* — Paul Wartalowicz
(74) *Attorney, Agent, or Firm* — Robert P. Lenart, Esq.; Pietragallo Gordon Alfano Bosick & Raspanti, LLP (57) ABSTRACT

A process for forming and maintaining a carbonaceous bed with coke replacement units suitable for use in pyrolytic processes includes the steps of: forming a plurality of non-coke units that are either or both irregularly shaped natural wood blocks and bricks including carbon-containing fines and one or more binders; forming an initial carbonaceous bed by a quantity of particles of coke in which at least about 25% of the carbon content of the initial bed is provided by said quantity of non-coke units and up to about 75% of the carbon content of the initial bed is provided by said quantity of particles of coke; and performing a pyrolytic process with the carbonaceous bed including reacting carbon in the bed with other added process material at an elevated temperature in the bed and supplementing carbon material during the pyrolytic process by adding additional carbon material of which at least 25% of the additional carbon material is not coke.

19 Claims, 6 Drawing Sheets

(51) Int. Cl.
*C04B 28/04* (2006.01)
*C10J 3/02* (2006.01)
*C10J 3/18* (2006.01)
*C10J 3/20* (2006.01)
*C10J 3/34* (2006.01)
*C10J 3/72* (2006.01)
*C04B 111/00* (2006.01)

(52) U.S. Cl.
CPC .... *C10J 3/20* (2013.01); *C10J 3/34* (2013.01); *C10J 3/72* (2013.01); *C04B 2111/00474* (2013.01); *C10J 2200/06* (2013.01); *C10J 2300/0983* (2013.01); *C10J 2300/0993* (2013.01); *C10J 2300/1238* (2013.01); *Y02W 30/92* (2015.05)

(56) References Cited

U.S. PATENT DOCUMENTS

| | | | | |
|---|---|---|---|---|
| 4,280,876 A | * | 7/1981 | Green | 201/9 |
| 4,497,661 A | * | 2/1985 | Valenti | 75/317 |
| 4,526,612 A | | 7/1985 | Eriksson et al. | |
| 4,680,096 A | | 7/1987 | Dosaj et al. | |
| 4,732,092 A | | 3/1988 | Gould | |
| 4,828,607 A | | 5/1989 | Dighe et al. | |
| 4,998,486 A | | 3/1991 | Dighe et al. | |
| 5,114,487 A | * | 5/1992 | Gartshore et al. | 106/695 |
| 5,143,000 A | | 9/1992 | Camacho | |
| 5,304,232 A | * | 4/1994 | Westley | 75/571 |
| 5,364,447 A | * | 11/1994 | Philipp et al. | 75/500 |
| 5,541,386 A | | 7/1996 | Alvi et al. | |
| 6,119,607 A | | 9/2000 | Guy et al. | |
| 6,971,323 B2 | | 12/2005 | Capote et al. | |
| 2007/0289216 A1 | | 12/2007 | Tsangaris et al. | |
| 2008/0299019 A1 | | 12/2008 | Dighe et al. | |
| 2009/0307974 A1 | | 12/2009 | Dighe et al. | |
| 2010/0199557 A1 | | 8/2010 | Dighe et al. | |
| 2012/0061618 A1 | | 3/2012 | Santoianni et al. | |

FOREIGN PATENT DOCUMENTS

| | | |
|---|---|---|
| WO | 2010093553 A2 | 8/2010 |
| WO | 2011008069 A1 | 1/2011 |
| WO | 2012106084 A2 | 8/2012 |

* cited by examiner

Figure 5
SOOT RECOVERY AND GASIFICATION

PLASMA GASIFICATION REACTORS WITH MODIFIED CARBON BEDS AND REDUCED COKE REQUIREMENTS

CROSS-REFERENCE TO RELATED APPLICATIONS

This application is a divisional application of U.S. patent application Ser. No. 13/199,814, titled "Plasma Gasification Reactors With Modified Carbon Beds And Reduced Coke Requirements", filed Sep. 9, 2011, which claims the benefit of U.S. Provisional Application No. 61/403,123, filed Sep. 11, 2010. Both of these applications are hereby incorporated by reference.

U.S. patent application Ser. No. 13/199,813, by some of the present inventors and others and assigned to the same assignee as the present application, titled "Enhanced Plasma Gasifiers for Producing Syngas," includes descriptions of plasma reactors and their operation combinable with the subject matter of the present application and is hereby incorporated by reference for such descriptions.

FIELD OF THE INVENTION

The invention relates to reactors that can be applied for gasification or vitrification of a wide variety of materials and which have reaction beds of carbonaceous material. Plasma gasification reactors are one form of such reactors to which the invention may be applied.

BACKGROUND

Plasma gasification reactors (sometimes referred to as PGRs) are a type of pyrolytic reactor known and used for treatment of any of a wide range of materials including, for example, scrap metal, hazardous waste, other municipal or industrial waste and landfill material, and vegetative waste or biomass to derive useful material, e.g., metals, or a synthesis gas ("syngas"), or to vitrify undesirable waste for easier disposition. In the present description "plasma gasification reactor" and "PGR" are intended to refer to reactors of the same general type whether applied for gasification or vitrification, or both. Unless the context indicates otherwise, terms such as "gasifier" or "gasification" used herein can be understood to apply alternatively or additionally to "vitrifier" or "vitrification", and vice versa.

PGRs and their various uses are described, for example, in *Industrial Plasma Torch Systems*, Westinghouse Plasma Corporation, Descriptive Bulletin 27-501, published in or by 2005; a paper by Dighe in Proceedings of NAWTEC16, May 19-21, 2008, (Extended Abstract #NAWTEC16-1938) entitled "Plasma Gasification: A Proven Technology"; a paper of Willerton, Proceedings of the 27$^{th}$ Annual International Conference on Thermal Treatment Technologies, May 12-16, 2008, sponsored by Air & Waste Management Association entitled "Plasma Gasification—Proven and Environmentally Responsible" (2008); U.S. Pat. No. 7,632,394 of Dighe et al., issued Dec. 15, 2009, entitled "System and Process for Upgrading Heavy Hydrocarbons"; a U.S. Patent Application of Dighe et al., Ser. No. 12/157,751, filed Jun. 14, 2008, entitled "System and Process for Reduction of Greenhouse Gas and Conversion of Biomass", (Patent Application Publication No. 2009/0307974, Dec. 17, 2009), and Dighe et al. patent application Ser. No. 12/378,166, filed Feb. 11, 2009, entitled "Plasma Gasification Reactor", (Patent Application Publication No. 2010/0199557, Aug. 12, 2010), all of said documents being incorporated by reference herein for their descriptions of PGRs and methods practiced with them.

It is known to set up and operate such PGRs with a carbonaceous bed in a lower part of a reactor vessel where the bed is arranged with plasma torches that elevate the bed temperature (e.g., to at least about 1000° C.) for thermal reaction with added material that is to be gasified or vitrified. Although there have been suggestions that carbon material for such a carbonaceous bed can be of a variety of carbon bearing materials, there has in the past been a heavy reliance on the use of coke for such purposes as it is about 90% pure carbon and has chemical, thermal, and strength properties that are favorable for many processes that are performed in such reactors. "Coke" is a term for a product of a fossil fuel e.g., coal or petroleum, subjected to drying, e.g., by baking, to drive off volatile constituents.

While the carbonaceous bed is an important component in the operation of a PGR, another known form of a gasification reactor is a gasifier utilizing a carbonaceous bed (of coke) but without utilizing plasma torches. The carbonaceous bed of such a reactor serves all the same functions as it does in a PGR with respect to the distribution of gases and the movement of molten materials. However, in addition, the carbonaceous bed also serves to provide the thermal energy for gasification that would otherwise be provided by a plasma torch. A carbonaceous bed of such a reactor may be initially activated to a temperature for gasification by, for example, brief ignition of natural gas supplied to the bed.

Among the desirable criteria of the carbonaceous bed of PGRs and other reactors is that it be of particles irregular enough in shape to leave voids allowing gases to flow to the surface of the particles where reactions occur and gaseous reaction products to rise from the bed. The voids also allow molten metals and other liquids resulting from the process performed in the reactor to flow down to a metal and slag exit port. Voids of the bed and the porosity of particles of the bed can contribute to desirable reactions and flow characteristics. Coke allows the formation of such a bed and has sufficient strength of the particles for many processes not to be crushed during operation by the burden of working material deposited on top of the bed.

Despite the satisfactory performance that coke very often provides, it is sometimes the case that factors such as the expense of coke and concerns about its manufacture and use impacting the environment, as it is a fossil fuel, may prevent or limit its use in some processes at some reactor sites.

In the known prior art, U.S. Pat. No. 4,828,607 issued May 9, 1989, to Dighe et al., and entitled "Replacement of Coke in Plasma-Fired Cupola", discloses a process that includes providing coal instead of coke, although still a fossil fuel, along with metal scrap and a fluxing material, to a plasma-fired cupola to produce iron or ferro-alloys. This evidences fairly early interest in minimizing coke usage in such applications although coke still remains the only form of carbon material that is widely used in operating reactors with carbonaceous beds. Wood or wood products (e.g., charcoal) are known carbon sources but have not found practical application as significant coke replacements in pyrolytic reactors.

SUMMARY

A process for forming and maintaining a carbonaceous bed with coke replacement units suitable for use in pyrolytic processes includes: forming a plurality of non-coke units that are either or both irregularly shaped natural wood blocks and bricks including carbon-containing fines and one or more binders; forming an initial carbonaceous bed by a quantity of particles of coke in which at least about 25% of the carbon content of the initial bed is provided by said quantity of non-coke units and up to about 75% of the carbon content of the initial bed is provided by said quantity of particles of coke; and performing a pyrolytic process with the carbonaceous bed including reacting carbon in the bed with other added process material at an elevated temperature in the bed and supplementing carbon material during the pyrolytic process by adding additional carbon material of which at least 25% of the additional carbon material is not coke.

DETAILED DESCRIPTION

In various embodiments, the invention provides, in various forms and by various processes, reactors and carbonaceous beds that require less coke than has been generally the case in the past. The carbon required can be obtained, at least in part, by carbon bearing alternatives to coke. Examples include beds that have at least about 25% (it can be significantly greater up to 100%) of the carbon content of the bed made of non-coke units that may be either, or both, wood blocks of natural wood or bricks comprising carbon-containing particles or fines and one or more binders and possibly a catalyst. Any such materials may be applied in a bed also including coke (although coke may be replaced completely in some applications). Carbon of the bed may additionally include, if desired, for example, if included in feed material to the carbonaceous bed, other non-coke materials such as raw coal (anthracite or bituminous), charcoal, or process materials including biomass (any carbon bearing materials).

Some embodiments of the invention take advantage of, and make use of, carbon material resulting as waste from any of a variety of other processes (e.g., carryover from any gasification reactor, fly ash from coal fired boilers, as well as others) which contribute to lessening requirements for coke in the bed. For one thing, they may be advantageously used as particles or fines in making the above-mentioned bricks. Such waste carbon materials may also be included in the feed stock to the reactor without being formed into bricks.

In connection with the use of extraneous waste carbon materials referred to herein, it is immaterial whether those carbon atoms were ever previously in any form of coke. Therefore, the examples of the beds including non-coke units such as wood blocks and bricks with carbon material generally intend that the carbon bed have such non-coke units in a range of about 25% to 100% and about zero to 75% coke (referring to quantities of carbon atoms in the respective materials), where some of that 0 to 75% coke may be replaced by carbon of feed materials (other than the mentioned non-coke units), up to, e.g., about 10% of the total carbon. In some processes it may be favorable to start up a reactor with a bed of coke as has been formerly used. As operation continues after start-up, and the coke is consumed, increasing quantities of the non-coke units can be added.

The carbonaceous beds with the non-coke units of the above examples are believed suitable for use in a variety of pyrolytic processes. Just by way of a more particular example, they are suitable for, but not limited to, use in a PGR process of gasification of biomass or municipal waste to produce syngas.

The non-coke units are of varied or irregular shape and size to leave voids in the bed as necessary for gases to flow to carbon reacting locations and to rise within the bed and exit from the bed. Also, the voids are for allowing liquids, including molten slag and molten metals, to descend through the bed to an outlet at the bottom.

The mentioned non-coke units are believed superior to coke alternatives such as anthracite coal or charcoal as significant bed constituents in achieving better properties, closer to those of coke, for efficiency of reactions while maintaining strength to support working material without being crushed, which tends to close voids in the bed and impede desirable reactions and flow of molten slag and metals through the bed. Conventional charcoal briquettes, for cooking, are considered relatively weak in strength compared to coke or the non-coke units presented here.

In addition, the non-carbon components in the coke replacement units (i.e., the mentioned blocks or bricks) can be engineered to be useful additions to gasification and/or vitrification processes. Wood, as an example, typically contains about 35-40% by weight of oxygen, which can replace a portion of the oxidant being fed to a gasifier as a gas. Also, in vitrification or in gasification processes in which the feed contains inert materials which will exit the process as slag, additives which are needed to flux or modify the inert materials to produce the desired slag chemistry can be added instead to the brick formula along with the carbon source. For example, one or more binders in the bricks can be selected to satisfy the requirements of those additives where cement type binders will typically provide calcium for fluxing properties while silicate binders will serve as modifiers to the slag chemistry.

In metal melting applications, where the slag chemistry is an integral part of the final metal chemistry, the brick formulation can be engineered to incorporate slag making ingredients, resulting in less need for a separate feed of those ingredients and to provide more intimate contact of those materials with the carbon reductant.

In addition to the foregoing, embodiments of the present invention include, either in addition to or independent of the use of the mentioned non-coke units, various other ways of constructing or operating a reactor that can contribute to a lessening of the amount of coke required for the carbon bed (as well as consuming some otherwise waste materials). These include any of the following: using spent potliner material from the aluminum industry; and/or providing a reactor with a charge bed (or feed bed) support that is also a gas distributor and a slag screen.

The carbon liner of the potliner is very high in carbon content. It is joined with refractory material, such as a ceramic. Spent potliner material is a listed hazardous waste that is difficult or expensive to dispose of. In embodiments of the present invention, there are a number of ways to use the material in reactor carbon beds. The carbon can be applied as particles in the above mentioned bricks (as any other carbon containing material can) but potliner carbon material may also be used in particles or chunks that substitute for coke in the bed. The refractory part of the potliner (sometimes available from aluminum makers intermixed with the carbon liner, or separately) can be placed, in particles or chunks, either in the bricks or otherwise in the bed in addition to the carbon and be a beneficial slag additive (when used in a quantity that meets the composition requirements for the reactions occurring in the bed).

A charge bed (or feed bed) support grid can be disposed horizontally across the reactor inner volume below one or more main feed chutes and above the region in which plasma heated gas is developed. The grid, in some embodiments, has closely spaced grid elements of refractory material with cooling to prolong life, e.g., by inner passages for water cooling in the interior of the grid elements. Operation of the reactor is conducted so that the cooling allows the refractory to survive for a useful period of time but without slots or other grid openings becoming closed by freezing slag or metal within them. Hot gas flow from the region below the grid, through the grid openings, will gasify charge bed material on top of the grid and resulting slag from the gasified charge bed material will flow down through the openings. (In this particular example, very little, if any, of the ungasified charge bed material would pass through the small openings of the grid.) This arrangement allows the use of less carbon bed material (coke or otherwise) as well as embodiments of desirable reactors and their operation with no carbon bed. Furthermore, and more generally, any support for charge bed material above a carbon bed, including a support with openings that allows some appreciable amount, but not all, of the charge bed material to fall onto the carbon bed, will still, to some extent, lessen the burden of the charge bed on the carbon bed and, hence, reduce the strength required for the carbon bed materials to support the charge bed. This, in turn, allows selection from a wider range of carbon material particles or non-coke units, including those that may not have the strength of coke particles.

A PGR, with innovative feed arrangements configured to enhance a supply of non-coke feed materials, can be relatively continuous and dependable. An example in this category is the use of an eductor for carbon fines injection into a carbon bed.

Other reactor configurations can contribute to less consumption of carbon in the bed, such as by permitting operation at a lower temperature. A PGR configured with one or more feed chutes at a height no greater than just above the top level of a charge bed is a form of reactor of general utility as well as having a capability to be operated with a lower bed temperature if desired. In some instances, reactors are operated to gasify feed materials that are uncompacted and in pieces that are diverse in size and weight. (For example, shredded biomass or municipal waste including paper products.) A higher percentage of the light weight feed material pieces can be reacted by hot gases rising up from the charge bed where the feed chutes are close to (or under) the charge bed surface to a greater extent than in prior practice in which feed chutes have been located well above the charge bed in an upper section of the reactor and where more of the lighter pieces of feed material did not descend enough to reach sufficiently hot gases for reaction. A large percentage of the lighter pieces may exit the reactor with the exhaust gas in that case. In the new arrangement, any light feed materials that do not descend directly onto the charge bed are more certain to float immediately above the charge bed and reach a high temperature from gases rising from the nearby charge bed so they are gasified. This contributes to the top gas, or syngas, production of the reactor and permits lower demands on the carbon bed, as long as the carbon bed temperature would still be sufficient to maintain molten slag flow. This arrangement can be applied, for example, and without limitation, where the reactor also has, at about the same elevation as the charge bed surface and the feed chutes, one or more gas inlets for oxygen (air) that takes part in reactions of the floating feed material and is regulated to assist in forming carbon monoxide from that feed material.

The carbon beds described in the foregoing examples are generally applicable to gasification (or vitrification) reactors with a fixed or stationary bed but are not necessarily limited thereto as they may also be applied to fluidized beds. In addition, the carbonaceous beds of other thermal reactors besides PGRs may be similarly modified to reduce coke requirements.

Figure 1:
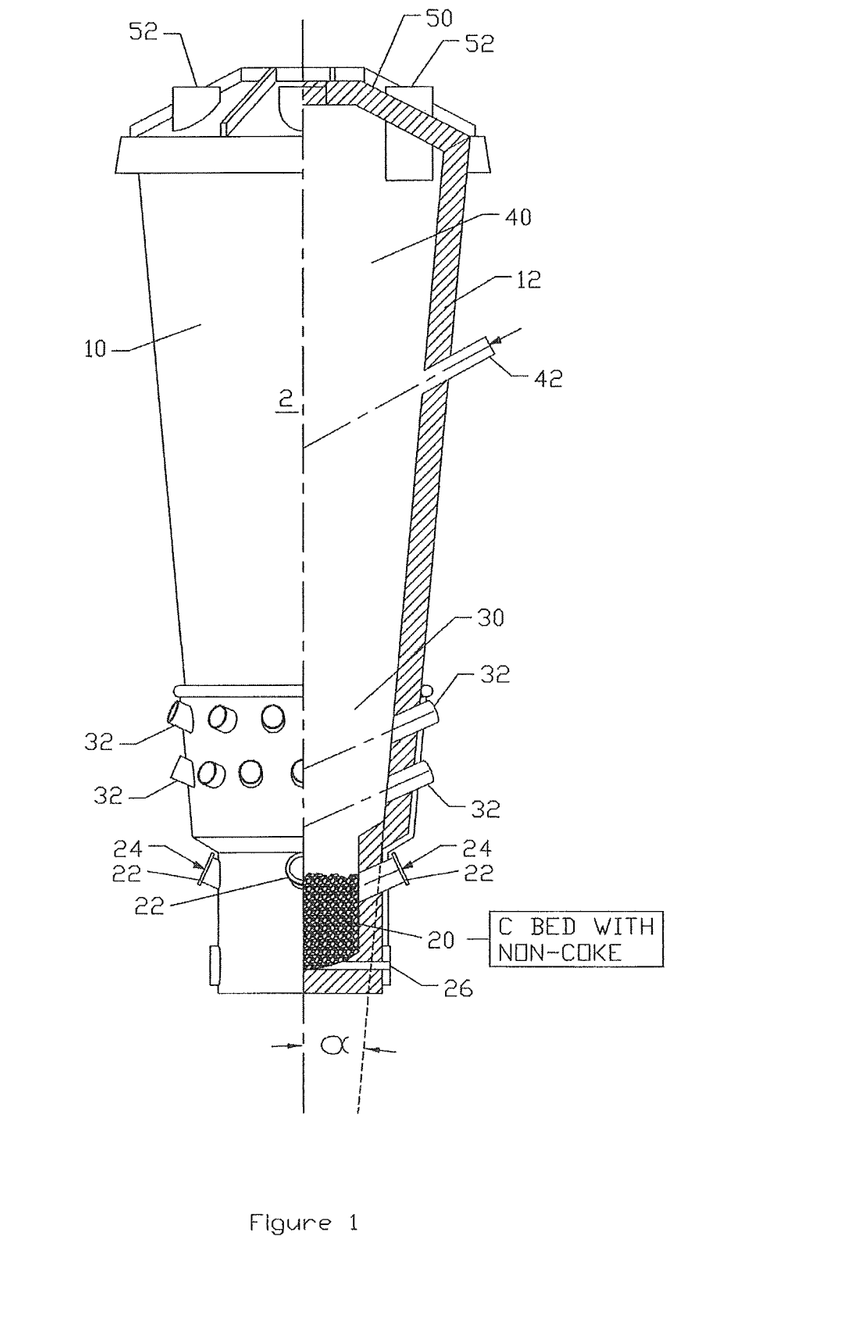
FIG. 1 is an elevation view, partly in section, of an example of a plasma gasification reactor in accordance with an embodiment of the invention.

FIG. 1 is an example of a PGR of general capability for gasification and vitrification of various process materials. One manner of operating such a PGR is for gasifying material to produce a syngas from the feed material. The feed material may include, as examples, any one or more of materials such as biomass, municipal solid waste (MSW), coal, industrial waste, medical waste, hazardous waste, tires, and incinerator ash. The syngas can contain useful amounts of hydrogen and carbon monoxide for subsequent use as fuels.

The reactor of FIG. 1, shown in full elevation in its left half and vertically sectioned in its right half, has a reactor vessel 10, generally of refractory-lined steel (the lining is not specifically shown in the drawing), whose prominent parts include or contain a carbonaceous bed 20 above which is a section for a charge bed 30 of process material, such as biomass, with a freeboard region 40 above the charge bed 30, and the freeboard region extends up to a roof 50.

The portion of reactor vessel 10 enclosing the carbonaceous bed 20 has one or more (typically two to four) nozzles 22 (sometimes alternatively referred to as ports or tuyeres) for location of a like number of plasma torches 24 (not shown in detail) for injecting a high temperature plasma heated gas into the bed 20. The plasma nozzles 22 may additionally be arranged to introduce additional process material that may be desired, such as a gas or liquid (e.g., steam) or some solid particulates, for reactions within the bed 20 along with the material of the charge bed 30. (Such additional process material may also be added directly to the bed 20 by nozzles not having a plasma torch.) The reactor vessel 10 also has at the bottom a molten slag and molten metal outlet 26.

A part of the reactor vessel 10 that is around the charge bed 30 and above the carbonaceous bed 20 further includes some additional nozzles or tuyeres 32 that, usually, do not contain plasma torches but provide for the introduction into the charge bed 30 of further process material, if desired, such as in the form of a gas, liquid, or solid particulates.

The upper feed section or freeboard region 40 of the reactor vessel is arranged with one or more process material feed chutes 42. Here, one feed chute 42 is shown in a side wall. More generally, one or more feed chutes can be at any location in the side wall of the reactor vessel 10 or the roof 50 for depositing feed material initially onto the carbonaceous bed 20 as well as during operation of the reactor to add to the charge bed 30 as its process material is diminished by the reactions that take place in the reactor.

The roof 50 encloses the top of the reactor vessel 10 except for one or more outlet ports 52 for gaseous reaction products (e.g., syngas) to exit from the reactor vessel 10. Gas outlet ports may be variously provided either in the roof 50 or the sidewall of the reactor vessel 10. At least where feed material through any feed chutes includes particulates, it is usually desirable for any gas outlet ports 52 to be located far enough away from the point of entry of feed material to avoid excessive exiting of unreacted particulate matter through the gas outlet ports.

The PGR configuration shown in FIG. 1 is generally in accordance with an example embodiment of the copending application of Dighe et al., Ser. No. 12/378,166, filed Feb. 11, 2009, Patent Application Publication No. 2010/0199557, Aug. 12, 2010, which, among other things, includes a generally upwardly and continuously expanding conical wall 12 of the reactor vessel 10 which can provide beneficial gas flow characteristics in the charge bed 30 and the freeboard region 40. Said application is incorporated herein by reference for its description of reactor configurations, including variations of that shown in FIG. 1, and their operation. The present invention, however, is not restricted to reactors with such configurations.

PGR practice, and practice with other types of pyrolytic reactors with a carbonaceous bed, have used, at least almost always, a bed that is substantially all of coke. Coal is sometimes mixed with the coke but any other carbon bearing material has been very minor and incidental to the structure and operation of the reactor. Coke has a composition with a high content of carbon (about 90% by weight), it can be formed in various shapes and sizes so particles of coke, e.g., with average cross-sectional dimensions of about 10-15 cm., can have ample carbon surfaces for reactions, provide voids for upward gas flow and downward flow of liquids, and strength sufficient to maintain voids throughout operation. The full size distribution or variation of particles of a carbon bed with coke is preferred to be greater than about 5 cm. to prevent the void spaces from being too small for proper liquid flow and less than about 25 cm. to minimize material handling issues. Where up to about 10% of the carbon in the bed 20 is of finer carbon particles (e.g. injected directly into the bed 20), adequate voids for liquid flow can be maintained.

In the PGR of FIG. 1, the carbonaceous bed 20 (hereinafter sometimes referred to as a C bed) includes non-coke material to a significant extent, during at least some of its operation, such as at least about 25% of the C atoms of the bed being not in coke units. For that reason, in FIG. 1, the carbonaceous bed 20 is further identified by the legend "C BED WITH NON-COKE".

Examples of non-coke materials for use as at least part of the bed 20 are natural wood blocks and, also, bricks including particles of a carbon-bearing material with one or more binders. The non-coke materials are formed in particles or units of irregular size and shape so that when placed or assembled in a bed they have exposed surfaces resulting from voids that occur between some parts of them. The non-coke units of the bed 20 are generally of the same size range as the coke particles for reactor beds as discussed above, but are not limited thereto.

An initial carbonaceous bed 20 of a PGR, such as that of FIG. 1 is generally established in the bottom of a reactor vessel 10 prior to operation of the reactor with feed material or powered up plasma torches. Then, once an initial bed 20 is in place, operating with active plasma torches 24 and depositing feed material to form a charge bed 30 commences. Most such processes are substantially continuous over a period of at least many hours with additional feed material applied, perhaps continuously or at least in frequent intermittent quantities. The reaction of the plasma heated gas with the C bed 20 inherently depletes carbon from the C bed. However, the rate at which the carbon in the bottom carbon bed 20 is consumed is much lower than the rate at which the feed material is gasified. Therefore, an initial C bed 20 only requires minor additions of carbon material in the course of processing a much larger amount of feed material. Some aspects of adding carbon material to an initial C bed are described below.

Typical operations, such as for production of a syngas, include forming a charge bed 30 on top of the C bed 20 by depositing feedstock through the feed chutes 42 where the feedstock may be, for example, biomass, municipal waste, coal, or mixtures thereof. During or after formation of an initial charge bed 30 that extends above the additional nozzles 32, those nozzles are used to inject fluids such as air, oxygen, or steam into the charge bed 30 while the plasma torches 24 operate with a torch gas, such as air, and, perhaps some steam or other fluid or small particles of solids are injected into the C bed 20 through the nozzles 22.

For production of syngas, to exit through the exit ports 52, it is desirable to operate in a manner to produce carbon monoxide and hydrogen. Carbon dioxide may be produced to some extent but carbon monoxide can be favored under conditions that limit air or oxygen in relation to carbon in the reactor.

As mentioned above, in such an operation, the reactor will consume carbon of the C bed 20 and the carbon is desirably replenished so the quantity of carbon is not appreciably reduced. A way of doing that in the past, for a coke bed, has been to add coke to a feedstock charge bed on top of the coke bed. For example, in production of syngas from biomass material, there has been coke added along with, i.e., mixed with or in alternate batches with, biomass. Processes have been performed in which such added coke amounts to about 5% by weight of the total of feedstock including coke.

Such carbon replenishment is also a consideration where the C bed 20 is to include non-coke material as described. Consequently, in accordance with one embodiment, the carbon material supplied to replenish the C bed 20 can be similar to the nature of an original C bed with non-coke and include at least about 25% of the added carbon being from non-coke materials. In some instances, for example, because of lower carbon content (compared to coke) of non-coke units that may be used, it would be desirable to make the total material of the C bed a greater quantity than in prior operation with just coke so there is an equivalent amount of carbon atoms in the bed.

The C bed improvements described herein, such as the use of wood blocks or carbon containing bricks as some or all of the bed (in lieu of coke), can also be applied to C beds in reactors without plasma torches. In such reactors, a C bed may be initially activated by ignition of a fuel, such as natural gas, supplied for a brief time as formerly practiced with a 100% coke bed of such a reactor.

Figure 2:
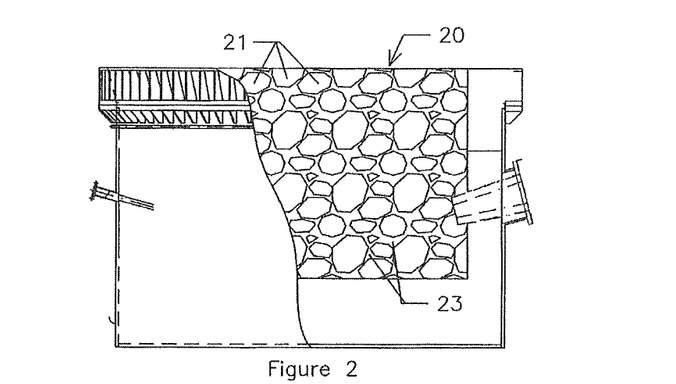
FIG. 2 is a partial elevation view of an example of a carbonaceous bed.

FIG. 2 shows an enlarged view of just a part of the apparatus of FIG. 1. The C bed 20 of FIG. 1 is shown in some additional detail to show individual particles 21 within the bed 20 and voids 23 occurring within the mass of the particles 21 due to the mixed size and irregular configurations of the particles. The size and shape of the particles 21 can vary widely. Just for example, the particles 21 may have an average of their dimensions in a range of from about 5 cm to about 25 cm, of which about 10 cm to 15 cm is an example of the average size of coke particles and about 10 cm to 25 cm for the average size of non-coke particles.

Figure 3:
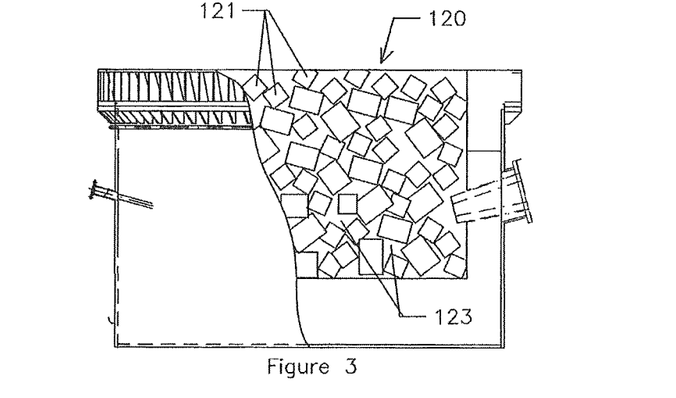
FIG. 3 is an elevation view of an example of a bed with non-coke wood blocks.

FIG. 3 shows an additional enlarged portion of a C bed 120 with particles 121 and voids 123 where the particles 121 are natural wood blocks.

The natural wood blocks or particles 121 are, for example, waste from a prior industrial source process such as the manufacture of wood pallets or are formed especially for use in the C bed 120. It is generally unnecessary to dry or treat the wood block particles (such as by charring any surface portions of them before applying them to the bed 120), although either or both some drying and charring can be performed if desired before placement in the bed 120. The wood block particles 121 can be added to a bed 120 that includes coke particles with or without intermixing the materials to produce any particular degree of homogeneity.

The wood for the wood blocks 121 can be of various plants or trees. Hardwoods such as oaks are one suitable wood material. Such woods, and the wood blocks 121, have a typical carbon content of about 50% by weight.

Figure 4:
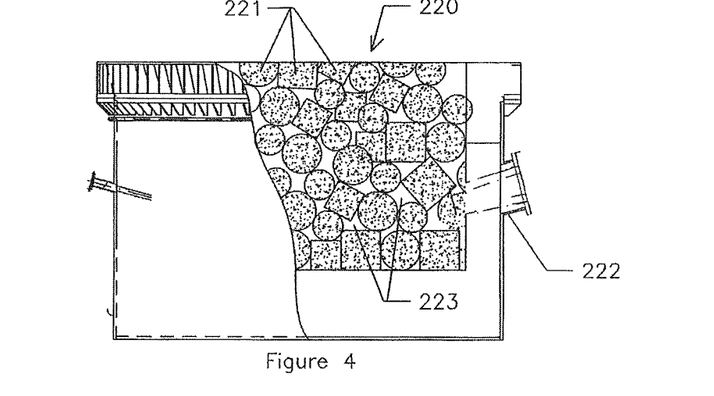
FIG. 4 is an elevation view of an example of a bed with non-coke carbonaceous bricks.

FIG. 4 shows an additional enlarged portion of a C bed 220 with particles 221 and void 223 where the particles 221 are bricks formed of carbon containing particulate material (e.g., wood chips, carbon fines, or a mixture of carbon containing material particulates). The bricks 221 may sometimes be referred to as "briquettes" but are distinct from common charcoal briquettes as explained further below FIGS. 2-4 are primarily to give just a rough idea of the appearance of the particles and voids referred to. The respective C beds 20, 120, and 220 need not always fully occupy the bottom portion of a reactor. Normally, any of the carbon beds discussed in a plasma reactor would extend up at least past the location of plasma torches, such as one that may be located in a plasma nozzle 222 of FIG. 4.

The bricks 221 of FIG. 4 can be molded, without any applied pressure or heat being necessary, of a mixture of the carbon particulates with one or more binders. Portland cement is one suitable binder. Other constituents may be included, for example as binders, or as fluxants or glass formers, and/or as catalysts. Some examples of bricks 221 have been formed of a mixture that included, by approximate weight percent, 40 parts carbon fines, 8 parts Portland cement, 4 parts bentonite clay, 4 parts sand ($SiO_2$), 12 parts sodium silicate, and 32 parts water. Such bricks have been made with a carbon content of about 66% by weight on a dry basis.

Other bricks 221 have been formed of a mixture that included, in approximate weight percent, 23 parts carbon fines, 21 parts Portland cement, 11 parts sand, and the balance (45 parts) water.

The bricks 221 can be molded to any size (similar in general size to coke particles) and shape, with characteristics to provide desirable voids in the bulk bed. It is not a necessity to vary the size or shape of bricks formed for use as bed particles such as the particles 221 of FIG. 4. It can be suitable, as well as economical, to use a single mold size and shape if desired. Same sized cylindrical (or spherical) units will inherently provide voids in the bed. Multiple-sized units can also be made and used together, if desired, preferably with a cross-sectional size distribution of about 5-25 cm. for most all the units and only a minor amount of any smaller carbon bearing units that tend to reduce voids.

Pressure and/or heat are also suitable means to form bricks with sufficient strength with a low quantity of, or no, binding agents. Generally speaking, and without limitation, examples of bricks formed with a cement binder are favored where the strength of the bricks is important.

The carbon particulates in the bricks 221 can be "carryover" particles from a gasification reactor and in this way provide a means of recycling carbon otherwise lost to the process resulting in increased carbon utilization and therefore higher efficiency. Carryover particles are unreacted or partially reacted particles that exit a reactor with gases from the reactor. They are generally desirable to be minimized but some will almost certainly result from any gasification process. The carryover particles can be made use of as part of the non-coke content of a C bed in bricks or introduced into a reactor as part of the feed material (at chutes such as 42, FIG. 1) or otherwise (e.g., through plasma nozzles 24 or nozzles 32 of FIG. 1).

In general, the carbon particulates (or "fines") used in making the bricks 221 are particles having average cross-sectional dimensions in a range of from about one micron to one centimeter and collectively have a total weight percent of carbon of at least about 50%. The average size range mentioned is not to exclude particles outside that range; particles finer than one micron can be quite suitable.

Combustion processes including boilers and incinerators also generate carryover particles such as fly ash and these materials may contain useful quantities of carbon that may serve as a source of carbon for carbon bed bricks. In addition, the properties of fly ash are also advantageous to the brick forming process allowing a reduction in the amount of calcium based cement binders that is needed.

The addition of materials to the bricks 221 which behave as catalysts, such as, but not limited to, nickel or iron, is another advantage of the bricks over coke alone as the carbon bed material. In this manner, the brick can be engineered to provide not only a functional source of carbon to the plasma gasification process and the fluxing agents needed to properly vitrify the inert materials contained in the feed being gasified, but also catalysts to cause certain desirable chemical reactions to occur.

One example of a catalyst inclusion in the bricks 221 is an addition of nickel or iron to the bricks on the order of a few percent by weight to catalyze the C+NO reaction to reduce the NO in the syngas to $N_2+O_2$. This is especially important in bioreactors converting syngas to liquid fuels. Formerly such catalysts, when used to minimize $NO_R$, had to be added with the feed material to the charge bed.

The following table gives additional examples of formulations for non-coke bricks, such as the bricks 221 of FIG. 4.

TABLE I

| Constituent | Range (wt %) | Formula A | Formula B | Formula C | Formula D | Formula E | Formula F |
|---|---|---|---|---|---|---|---|
| Carbon | 40-95 | 65 | 70 | 60 | 41 | 45 | 80 |
| Silica | 0-30 | 6.5 | 7-14 | 10 | 19 | 15 | |
| Calcium Carbonate | 0-25 | | | | | | |
| Fly Ash | 0-40 | | | 10 | | 20 | |
| Portland Cement | 0-20 | 13 | | | 39 | 20 | |
| Potassium Silicate Cement | 0-20 | | 8-14 | 20 | | | |
| Aluminum Silicate Cement | 0-20 | | | | | | 5 |
| Kaolin Clay | 0-20 | | | | | | |
| Sodium Bentonite | 0-20 | | | | | | |
| Calcium Bentonite | 0-20 | 5.5 | 5-6 | | | | 15 |

TABLE I-continued

| Constituent | Range (wt %) | Formula A | Formula B | Formula C | Formula D | Formula E | Formula F |
|---|---|---|---|---|---|---|---|
| Potassium Bentonite | 0-20 | | | | | | |
| Sodium Silicate | 0-20 | 10 | | | | | |
| Aluminum Hydroxide | 0-10 | | 2-3 | | | | |
| Nickel | 0-5 | | | | | | |
| Iron | 0-5 | | | | 1 | | |
| | | 100 | 100 | 100 | 100 | 100 | 100 |

The amounts, and ranges of amounts, are all in approximate weight percent of the overall composition that is mixed with water added (at least sufficient for cement hydration). The carbon is of particulates or fines as previously described. Binders include the cements and the clay or bentonite materials listed. Silica is a glassifier. Calcium carbonate (lime) is a flux agent. Fly ash also has fluxing properties; it also contributes some additional carbon to the mixture (typical fly ash is about 5% carbon). Sodium silicate (or water glass) is also a glassifier. Aluminum hydroxide contributes to binding. The additional constituents mentioned are nickel and iron which serve, if used, to help avoid $NO_x$ emissions as was previously discussed.

The initial column of ranges (before columns with Formulas A through F) shows an upper limit of about 95 wt. % for carbon particles, and a minimum of 0 wt. % for all the other constituents listed. That indicates, in any specific formulation, each of the secondary ingredients is individually optional but at least about 5 wt. % of one or more of them (e.g., binders) would be included with the carbon particles. Also, it is to be understood that Formulas A-F are mere examples without exclusion of others consistent with the ranges given in the first column. Therefore, for example, other formulations may include some amount of calcium carbonate, kaolin clay, sodium bentonite, potassium bentonite, and/or nickel even though Formulas A-F include none of those constituents.

An example process for forming bricks is for the ingredients of a formulation, such as Formula A, to be dry mixed followed by the addition of water at a weight ratio about one part water to two parts dry mix. The mixture is placed in molds of the desired size and shape and allowed to set up and air dry.

Some examples have been made in molds that produce short cylinders of varied sizes. The particles 221 of FIG. 4 represent such cylindrical units, where the rectangular appearing units are, or can be, cylinders viewed from the side.

A further example of processing is for the constituents of a formulation, such as Formula F of the Table, which has a relatively high C content, to be dry mixed followed by pressing the mixture into molds under pressure sufficient to solidify the bricks to the desired shape and size and then placed or fed into a reactor in a "green" state. The operating temperature of the reactor quickly cures the bricks to their final composition.

Any known brick making techniques may be applied for making the non-coke bricks such as the bricks 221 and the compositions are to generally include carbon particles in one or more binders adequate to make strong units along with optional quantities of flux agents, glassifiers, and catalysts like, or similar to, such additives to prior reactor carbon beds with coke.

"Carbon particles" referred to as brick constituents need not be 100% C atoms but the nature of the particles can influence how much particle material to use. Wood chips have adequate carbon for use in bricks but most likely in a greater quantity than carryover C particles.

An additional set of formulations for bricks can replace purer C particulates with wood particles that can vary in size from fine sawdust to wood chips. In such formulations the total composition may have up to about 95 parts (weight %) of the wood with lesser amounts of the other constituents mentioned in the Table above, in addition to the wood. By way of further example, a particular composition of that type includes 5 parts silica, 15 parts Portland cement, 5 parts calcium bentonite, and 75 parts of the wood. All would be mixed, perhaps with water, and molded or pressed as described above. In general, the relative amount of binder (and selection of a particular binder) will be determined by the size of the wood particles with the objective to enhance the quantity of wood, and hence carbon, in the bricks. Wood, and other biomass, particles generally have some volatilizable constituents that are driven off as a brick with such particles is heated. That is favorable for brick porosity.

Clearly, other formulations may include both wood particles as well as other carbon particles in non-coke units, they can be fed to the charge bed 30 through a feed chute, such as the feed chute 42 of FIG. 1 or some other, just as coke has been in the past, and they will (at least almost entirely) remain unconsumed as they descend through the charge bed 30 to the C bed 20.

Any of the shapes of particle units 21, 121, or 221 shown in FIGS. 2, 3, and 4 are just some suitable examples for non-coke units that can be applied.

By way of further clarification of examples, any of the compositions previously mentioned, such as in the discussion of Table I, may be varied to include wood (or other biomass) particles, or other carbon containing items with other elements, in place of some or all of the purer carbon particles (e.g., coal fines) in which case the composition would be adjusted to have a similar net amount of carbon atoms. To the extent wood or other biomass is used instead of coke or other mineral sources for the carbon content, there is a corresponding avoidance of fossil fuel use.

An example composition of the use of wood particles as the source of carbon in bricks is one with (in approximate weight % excluding water to be added), 75% wood particles, 5% silica, 15% Portland cement, and 5% calcium bentonite; in this case without any carbon from a fossil source. The wood particles may be, e.g., sawdust, wood chips, or a mixture thereof. The binder contents could be varied to maximize the amount of wood, and hence carbon, in the bricks consistent with adequate binding of the wood particles that are used.

Another favorable aspect is the facility in which the C bed composition can be varied over a course of operation. For example, one could elect to start up a reactor with a C bed of a high carbon source, such as coke, to limit the initial slag formation. This may be the case if the C bed is used to initially heat up the vessel and before it is hot enough to melt more inert material. Then, as heat-up is continued and completed, bricks, such as described above, can be introduced with resulting greater slag formation.

Some example bricks that have been made according to the foregoing description and used in place of some of the coke in a PGR gasifying biomass (and forming slag tapped from the reactor) with satisfactory performance substantially matching that of an all coke bed have included the following compositions of Table II.

TABLE II

|  | #1 Dry weight % | #2 Dry weight % | #3 Dry weight % |
| --- | --- | --- | --- |
| Coal Fines | 68.6 | 77.1% | 0.00% |
| Lime ($CaCO_3$) | 13.7% | 16.7% | 9.12% |
| Sand | 11.8% | 0.0% | 10.94% |
| Cement (Portland) | 5.9% | 6.2% | 32.76% |
| Char | 0.0% | 0.0% | 47.18% |

Table II gives the weight percentage of the dry ingredients. Water added and mixed with the dry ingredients was, in the case of batch #1, about 10% of the dry mix weight, and for batch #2, about 20% of the dry mix weight, and for batch #3, about 15% of the dry weight mix.

In general, the brick compositions referred to are for the starting materials and the resulting compositions of finished bricks is not significantly different other than the absence of water.

One of the favorable aspects of the use of bricks in accordance with the invention, over the use of coke, is the ability to vary the composition of the bricks. That can be done for reasons including the nature and composition of the feed material into the reactor. The example compositions of Table II were particularly chosen for use with biomass feed material.

Without limiting the above description, the following additional examples of making and testing non-coke brick units are provided.

The starting materials include, in approximate dry weight %,

| Coal fines (averaging less than 5 mm. size) | 60% |
| --- | --- |
| Lime ($CaCO_3$) | 20% |
| Sand | 10% |
| Portland Cement | 10% |
|  | 100% |

Weighted amounts of the dry ingredients (with a total weight of 100 to 300 kg.) are dry mixed in a cement mixer about 5 to 10 minutes and become thoroughly intermixed. Water is slowly added to the mixer so as to have the water incorporate with the dry ingredients and the mixture to have wetness only to extent it can set, and not any wetter. (It is found that excess water may result in bricks with a higher density, and more limited porosity, than is generally desirable.) After sufficient water is added, mixing is continued about 5 minutes longer to insure the mixture's readiness. (Water makes up about 15-25% of the total mixed mass.)

Molds are made of about 12 cm. lengths of PVC pipe having an inner diameter of about 10 cm. The mixture is placed in the molds and allowed to set about 3 to 5 minutes before the molds are removed by lifting them from around the bricks that have set.

The bricks are then allowed to air dry and cure for about 72 hours. A sample of the bricks can be subjected to a drop test as a strength assessment. The drop test may be to drop the bricks from about 3 meters onto a hard (e.g., concrete) surface and observe whether the bricks crumble (i.e., break into any more than about 2-3 large pieces). If they crumble, that suggests they require more drying or the composition would be better changed by increasing the cement amount by an additional 1-2% of the dry weights.

Once satisfactorily strong bricks are formed, they may be used in a reactor immediately or later, if kept reasonably dry.

A comparison test can be performed in which successive phases of operation are conducted in a reactor including:
Phase O-Baseline; C bed of coke; 1-3 days operation;
Phase I; 25% carbon addition of bricks; 12 hours;
Phase II; 50% C from bricks; 12 hours;
Phase III; 75% C from bricks; 12 hours;
Phase IV; 100% C from bricks; 12-24 hours; and
Phase V; return to 100% C from coke; 24 hours.

During each phase there is monitoring of all significant parameters including: temperatures and pressures at several levels in the reactor; data on feed rates; amounts and rates of slag production; syngas volume and its $O_2$ and CO level; and plasma torch conditions, including torch power, amperage, voltage and air, including torch air, shroud air, and spare nozzle air.

All of the above, and similar tests with other brick compositions, confirm that bricks are capable of replacing significant amounts of coke with satisfactory overall reactor performance.

As mentioned before, carbon particles incorporated into bricks, such as the bricks 221, can come from any carbon particle source. Some sources are made extra attractive because they allow economical use of carbon in mixtures or forms that is otherwise difficult or expensive to dispose of.

The earlier discussion mentioned the use of spent potliner-carbon material from the aluminum industry. In normal aluminum making, such material is contaminated with cyanide (CN). It is often available to take from a manufacturer for no cost, or with a payment to the party taking it. Furthermore, the potliner carbon can be used either, or both, as particles in bricks or as chunks, like particles 21 of FIG. 2, as C bed material without processing into bricks. Additionally, the refractory (ceramic) material is also available for use in the bricks, or directly in a bed, to serve as a flux.

Spent potliner (or SPL) material is known that in the total composition of carbon and refractory material includes about 23% pure carbon. Other constituents include quantities of metal oxides, e.g., $SiO_2$, $Al_2O_3$, and $Na_2O$ which may also be useful in a gasifier to some extent.

The SPL, as made available by aluminum manufacturers, may be separated into what is called a "first cut" that includes about 55 to 65% C and less of the metal oxides. This is the hazardous material needed to be disposed of under government regulations. When so separated, there is a "second cut" of nonhazardous material that includes more of the refractory material of the potliner and has only about 1 to 5% C and a more significant amount of metal oxides, all of which can be made use of, in some quantities and relative amounts, in the gasifiers that rely on a carbon bed and fluxing and glassifying agents to help fluids flow through the bed.

Another source of otherwise unwanted carbon waste that is usable in the non-coke bricks is from soot water produced by gasifiers. A number of currently operating gasifiers (e.g., for gasifying coal, heavy oils, etc.) produce a usable and desirable syngas but also create a soot water byproduct which has to be disposed of. As used here, the "soot water" may include any ungasified fuel constituents as well as metals and slag elements that may accompany the ungasified fuel.

Figure 5:
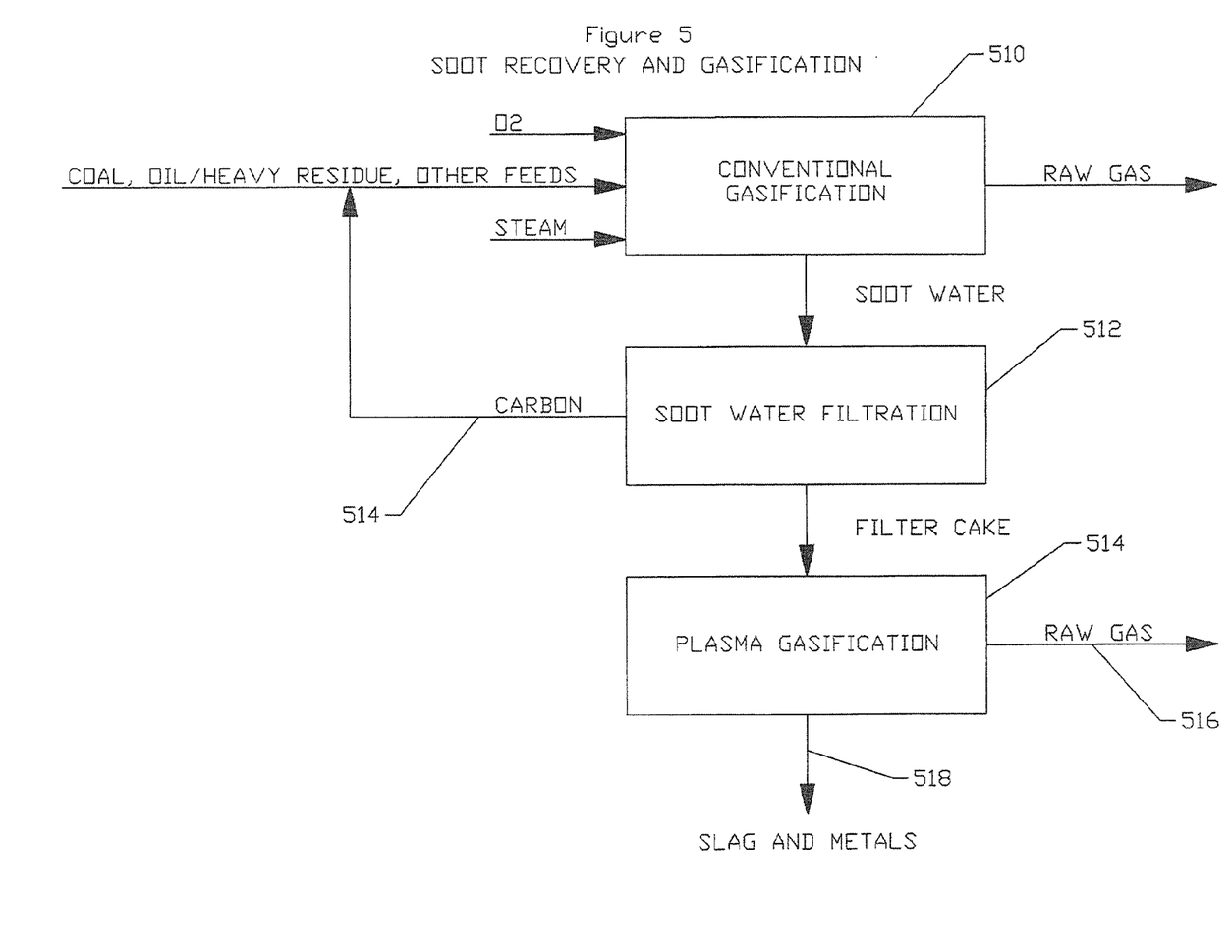
FIG. 5 is a block diagram of a system that is one example of the use of non-coke carbon in a PGR.

FIG. 5 shows a block diagram of one example of dealing with such soot water. In this example, the soot water resulting from some other ("conventional") gasification (block 510) is subjected to filtration with water being removed (block 512) and some filtered carbon being recycled back to the prior gasifier (feedback line 514). The remaining solids are formed into a filter cake (from the filtration 512) that previously had to be disposed of, such as in a landfill, but is now instead fed into a PGR (block 514) to yield additional raw gas (syngas) 516 and slag and metals 518 (that may have economic value).

By the present invention, soot water residue, such as a filter cake resulting from soot water filtration may be applied as C particles within bricks (like bricks 221 of FIG. 4) as well as being introduced in other ways into a PGR). (Filter cakes may be formed or ground down to yield suitably sized C particles).

As mentioned before, carbon bearing particles of a wide variety may be used in the bricks to be used as non-coke units in a C bed. Additional to the other mentioned sources are plastic materials. Plastic objects (e.g., waste plastic containers) may be mechanically reduced (e.g., by shredding) to form particles for inclusion in the bricks. Some common plastics that may be used instead of or mixed with, other C particles from sources such as coal or biomass are the following and their composition:

TABLE III

|          | HDPE    | PET     | PVC     | LDPE    |
|----------|---------|---------|---------|---------|
| Carbon   | 84.38%  | 62.28%  | 45.04%  | 67.13%  |
| Hydrogen | 14.14%  | 4.14%   | 5.60%   | 9.70%   |
| Oxygen   | 0.00%   | 32.88%  | 1.56%   | 15.80%  |
| Nitrogen | 0.06%   | 0.00%   | 0.08%   | 0.46%   |
| Chlorine | 0.00%   | 0.00%   | 45.32%  | 0.00%   |
| Sulfur   | 0.03%   | 0.00%   | 0.14%   | 0.07%   |
| Ash      | 1.19%   | 0.50%   | 2.06%   | 6.64%   |
| Water    | 0.20%   | 0.20%   | 0.20%   | 0.20%   |
| TOTAL    | 100.00% | 100.00% | 100.00% | 100.00% |

When such materials are used, for example in brick formulations such as those of Table I, the quantity may be adjusted to provide the desired amount of carbon. Because of the volatile constituents of the plastics, they, like biomass particles, devolatize and provide added porosity when heated.

Heating of bricks (whatever the C source) may be performed either prior to use in a gasifier or in a gasifier in operation. The latter, in-situ reacting of binder elements and driving off volatiles, saves on energy costs.

Figure 6:
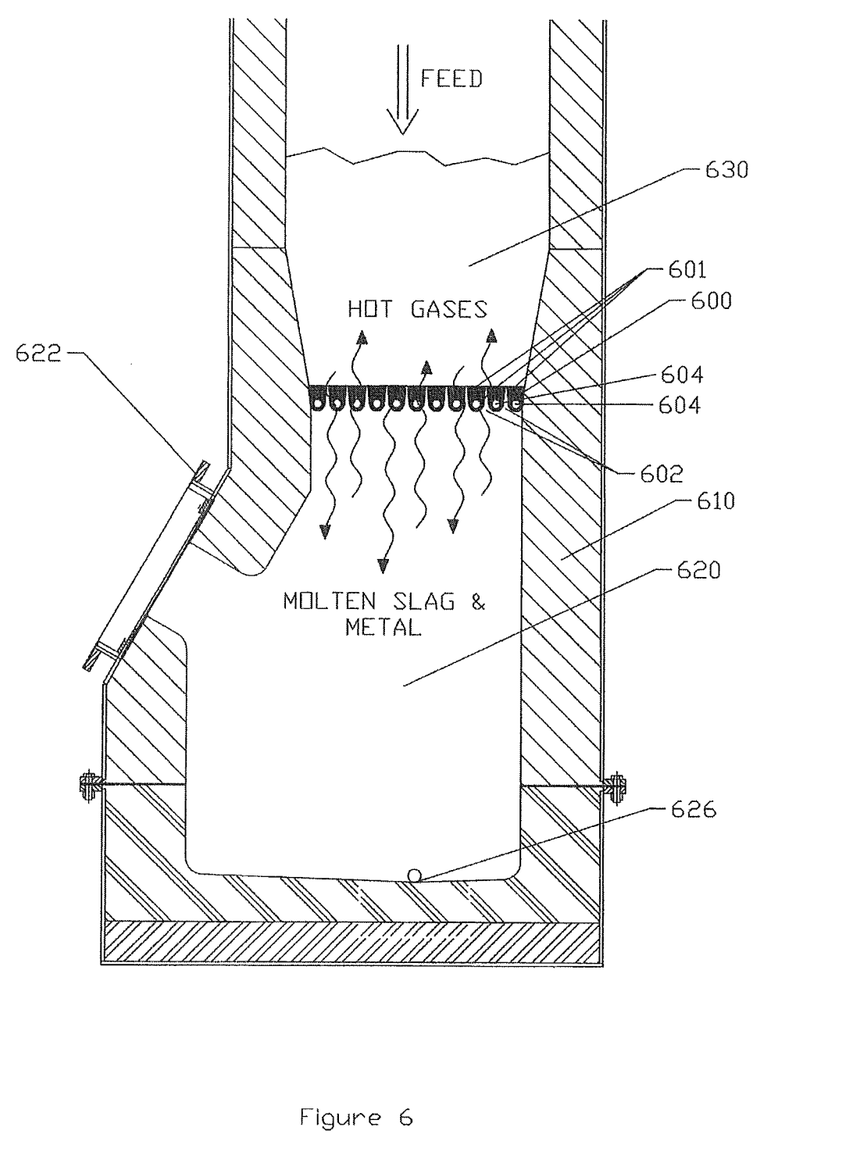
FIG. 6 is a partial, sectional, elevation view of a PGR with an example of a plate or grid supporting a charge bed.

FIG. 6 illustrates one example of a PGR with a grid or distributor plate 600 as was generally disclosed in the earlier discussion. Only a lower portion 610 of a PGR is shown with a thermal bed region 620 and a charge bed region 630. The plate 600 serves as a support for the feed bed 630, as a gas distributor for gas heated in the thermal bed region 620 and as a slag screen for descending molten material. For these multiple purposes, the plate 600 has a screen-like structure with grid elements 601 of refractory material and openings 602 (for gas and liquid flow). The screen or plate 600 of refractory material is equipped with a cooling arrangement, such as inner passages 604 for cooling water. The openings 602, in this example, are intentionally quite small, e.g., no greater than about 10 mm, to limit or exclude charge material from the bed 630 from falling through to the lower region 620. But the openings 602 are large enough, e.g., at least about 3 mm., to allow easy flow of gases (e.g., oxidant heated by a plasma torch in a nozzle 622 from region 620) up into the charge bed 630 and easy flow downward of molten slag and metal through the screen 600 into region 620 for exiting through an outlet port 626 at the bottom of region 620.

Region 620 may contain a carbon bed. If it does contain a carbon bed, it may be of lesser extent than in usual PGR beds and may include any type of carbon material without concern for whether the material is strong enough to support the charge bed without collapsing and eliminating the voids that enable gas and liquid flow. Here the charge bed 630 is substantially supported on the plate 600.

In alternate embodiments in which a grid or plate is used with larger openings allowing some solid charge material to pass down to a C bed in a lower region, such a grid or plate may still allow some greater flexibility in the selection of carbon bed material because of at least partial support by the grid.

A PGR 610 of FIG. 6, and more generally any PGR with a plasma heated gas region 620 at a level from which hot gases rise into a process material, can be operated with little or no carbon bed and still achieve gasification of process material. The arrangement of FIG. 6, with the distributor plate or grid 600, can be favorable for operating without a C bed because the gas and liquid flows are not dependent on voids occurring in either in a C bed or within process material. This form of operation, whether with the PGR of FIG. 6 or some other, such as that of FIG. 1 but without the C bed, means the plasma heated gas input to the lower region provides all the energy for reactions, rather than getting a major contribution of thermal energy from a heated C bed, and also means carbon atoms for forming desirable product gas, such as a CO, are all from feed material in the absence of a C bed. Any such mode of operation can, of course, completely avoid any need for use of coke in the reactor.

Figure 7A:
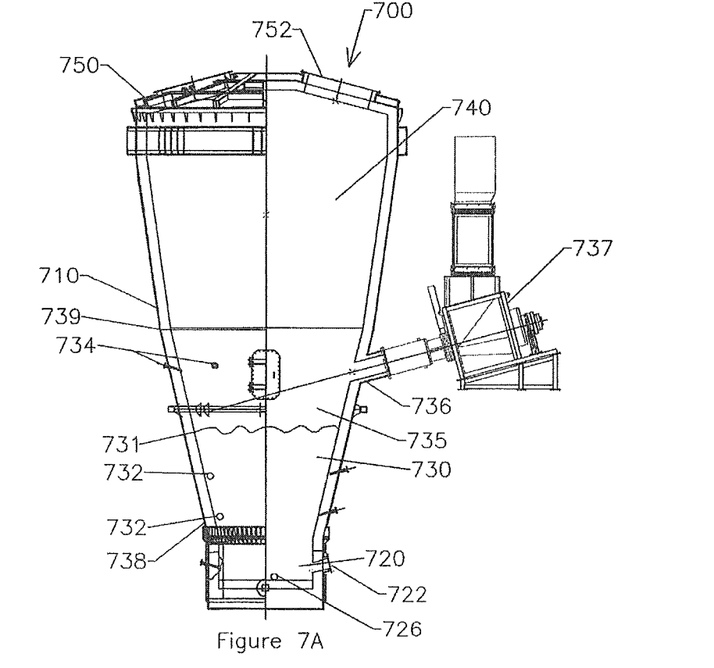
FIGS. 7A and 7B are, respectively, elevation and plan views of an example of a PGR with feed chutes at or near the top of a charge bed.
Figure 7B:
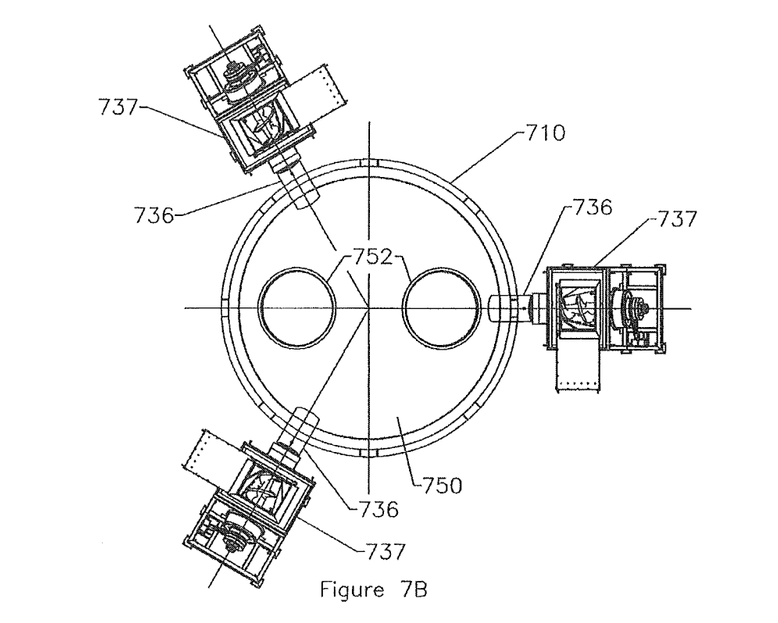

FIGS. 7A and 7B show elevation and plan views of a PGR reactor 700 that has general utility and, furthermore, can be operated in a manner that is favorable in some respects to overall efficiency of thorough reactions of process material with less dependence on energy from a C bed.

The reactor 700 is similar to that of FIG. 1 in several respects but with certain differences. A reactor vessel 710 is provided with a carbon bed region 720 above which is a charge bed region 730 and a freeboard region 740 up to a roof 750 with gas exit port 752. In this example, the wall of the reactor vessel 710 has a cylindrical portion that encloses the C bed region 720, a first conical portion with upward expansion that encloses the charge bed region 730 and also a region 735 just above the charge bed in region 730 (the top of which is represented by the line 731 in FIG. 7A). The wall of the reactor vessel 710 has a second conical portion with upward expansion enclosing the freeboard region 740. The conical portion for region 740, in this example, is at a lesser angle to the center axis of the reactor vessel 710 than that for the regions 730 and 735, an aspect that can contribute to beneficial gas flow in those regions.

In the example reactor 700 there are one or more plasma torch nozzles 722 to the carbon bed region 720, and there are additional nozzles or tuyeres 732 to the charge bed region 730, which may all be like or similar to such features of FIG. 1. There is also a molten slag and metal outlet port 726 from the C bed region 720. However, in reactor 700, there are one or more (three are shown) feed chutes 736 into the above-charge bed region 735 rather than well above as the feed chute 42 is shown in FIG. 1. (The lower feed chutes 736 are considered normally sufficient to replace any higher feed chutes but do not necessarily exclude provision of one or more additional feed chutes anywhere in the reactor wall or the roof 750 to region 740.)

The feed chutes 736 to the above-charge bed region 735 each have material feeding mechanisms 737 exterior of the reactor 700 for supplying feed material through the chutes 736. It is generally preferred, such as for economical operation, that the mechanisms 737 be such as to allow feed material to be supplied into the reactor 700 substantially continuously, at a fairly uniform rate, and that it can be supplied without need for extra steps to compact the feed material into more solid blocks of material. Loose biomass or municipal waste, for example, can be so processed. One example for the feed mechanism 737 is a screw feeder of which there are commercially available units available for moving materials.

By way of further example, a reactor 700 as shown in FIGS. 7A and 7B can be (in exterior dimensions) about 20 to 30 m. in total height with a cylindrical bottom portion for C bed region 720 about 3 to 5 m. high, a charge bed region 730 having a wall at an angle to the axis of about 10-15°; extending up from the C bed region 720 by about 4 to 6 m., and the above-charge bed region 735 extends approximately 2 to 3 m. above that with a wall angle the same as for region 730 in which the openings of the feed chutes 737 occur with a vertical dimension of about 0.5 to 1.5 m. The vertical heights given for regions 730 and 735 may overlap to some extent depending on charge bed conditions. Together they can be expected, in this example to total about 8 to 12 m. for the total vertical height of the first conical wall portion between levels 738 and 739. The height of the region 740, at a wall angle of about 5-10° (or about 3-6° less than the angle of the charge bed region 730), can be in the range of about 8 to 12 m. above the region 735. In this example, and generally for PGRs with similarly low feed chutes, it is the case that the feed chutes are located no more than about halfway up from the very bottom of the reactor vessel and/or no more than about 1 m. above the normal height of the charge bed in the reactor.

As a consequence of the location of the feed chutes 737, it is the case that pieces of light weight feed material, such as small pieces of biomass and paper pieces of municipal waste material, that tend to float above the charge bed due to upward gas flow, have a greater chance of reaction with the hot gases. In contrast, reactors with feed chutes such as that shown in FIG. 1, when operated with the same kind of feed material, can have a greater proportion of lighter pieces blown out of the reactor through the exhaust ports or float in the reactor at a high level at which the rising gases have cooled to an extent that the reaction efficiency is low.

While a reactor such as that of FIGS. 7A and 7B can be operated with a carbon bed of coke or any of the non-coke units described herein and the carbon bed will include about the same quantity of carbon atoms as formerly, it also happens that the extent to which hot gas energy promotes reactions of these lighter particles and pieces of feed material and contributes to the output of syngas, there can be somewhat lower demands on (less consumption of) carbon in the carbon bed and resulting overall less use of the carbon, whether as coke or non-coke.

An additional aspect of the reactor 700 of FIG. 7B is that within the above-charge bed region 735 there are one or more gas inlets 734 to the region 735. In addition to any air or other gases allowed to enter the reactor through the feed chutes 736 (typically not preferred to be a large amount), the gas inlets 738 can be used for controlled quantities of gas, such as air or oxygen, to further promote the reactions of the lighter materials that float in the region 735. It is essentially always the case, where the objective is to produce a useful syngas, to operate under controlled conditions of relative amounts of carbon and oxygen to promote oxidation of carbon to produce carbon monoxide (CO) rather than carbon dioxide ($CO_2$).

Feeding material to a charge bed, such as in region 730 of FIG. 7A, may alternatively or additionally be performed in a manner that may be referred to as "underfeeding". In that case, a feed chute (i.e., any one or more such chute), such as one previously described or other feeding device, would be located to be capable of delivering the feed material at a level below the level of the normally occurring top of the feed bed while still above the C bed of the reactor. Example embodiments of such an arrangement include those in which a feed chute like or similar to the feed chute 736 of FIG. 7A in form, but not in location, is located with its opening into the reactor 700 below the level of the line 731 in FIG. 7A. In this way, the processing of fine particles or light density matter in the feed material fed to the feed bed can be even more complete, to the extent that substantially all of the feed material is completely processed and essentially none goes out of the reactor with the gas output.

Figure 8:
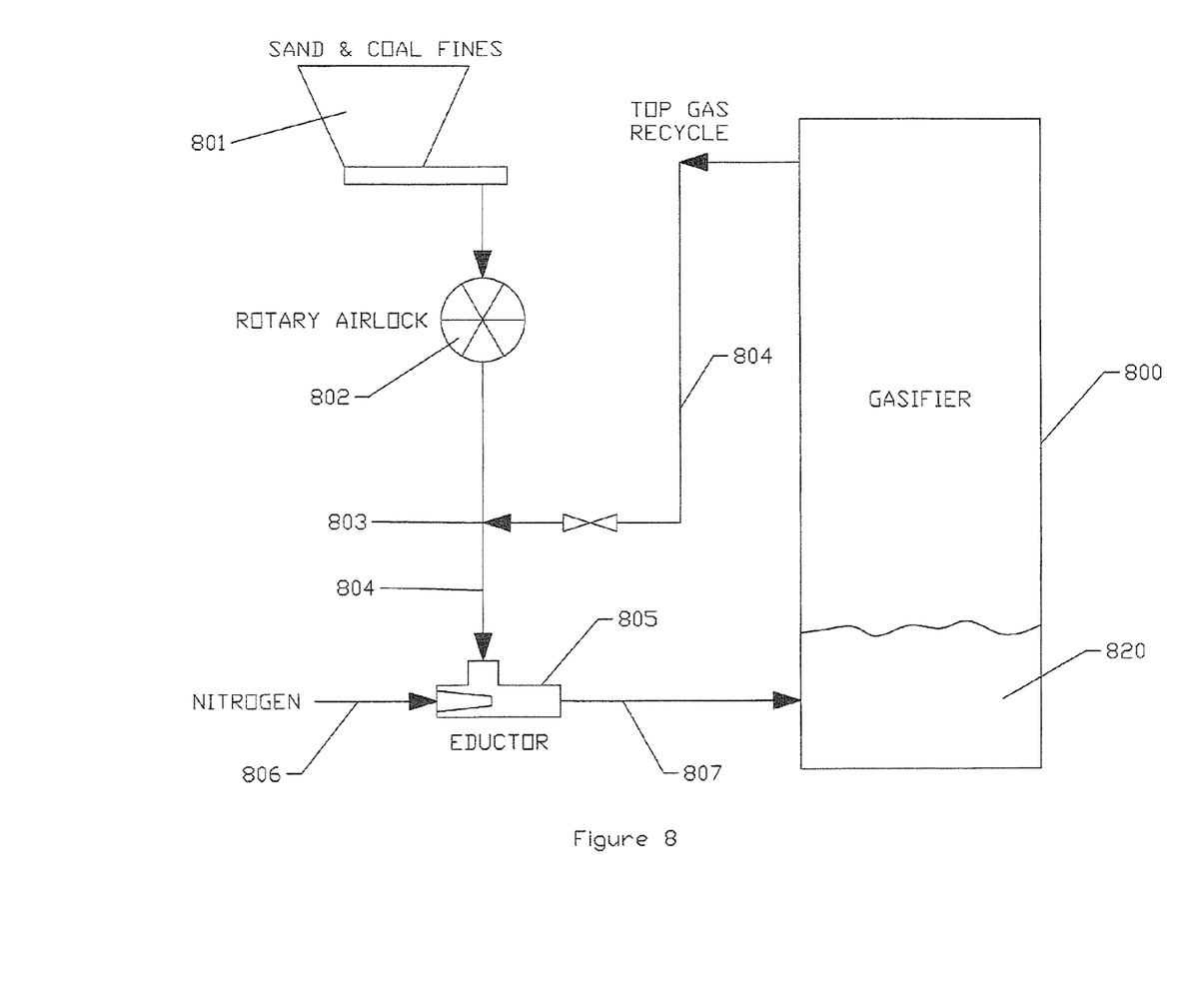
FIG. 8 is a schematic diagram of an example of a system for injecting particles or fines into a carbon bed of a gasifier.

FIG. 8 illustrates an innovative arrangement for introducing carbon into a gasifier reactor 800, which may be a PGR as previously discussed or another form of gasifier with a C bed 820. The system includes a supply of carbon fines 801, here shown as a mixture of sand and coal fines, that is gravity fed through a device such as a rotary airlock 802 to limit air entry. The solids from the airlock 802 descend to a junction 803 at which a top gas recycle loop 804 feeds in some fraction of gas generated in the gasifier 800. The solids, with the top gas, are carried together in a conduit 804 to an eductor 805 (a known type of device for drawing a low pressure gas, such as the top gas, to apply it to a higher pressurized region). The eductor 805 is fed pressurized gas, preferably an inert gas such as nitrogen, 806 whose flow draws in the top gas stream and solids so that the combination 807 is pressurized enough to enter the gasifier C bed 820. This allows controlled input of carbon particulates, such as coal fines, and additional flux or glassifier agents, such as sand, into the C bed 820 (through any nozzle opening, with or without a plasma torch). This can result in efficient use of such fines and supplement the carbon of the carbon bed to a degree that helps lessen need for other carbon such as coke.

Consequently there is seen to be a variety of ways for utilizing non-coke, and non-fossil fuel, units in carbonaceous beds of plasma gasification reactors and other similar reactors. The foregoing description provides a number of examples, but not necessarily all forms and variations of ways for practicing the invention.

What is claimed is:

1. A process for forming a carbonaceous bed with coke replacement units suitable for use in pyrolytic processes comprising the steps of:
    forming a plurality of non-coke units in the form of bricks comprising carbon-containing particulate material and at least one of: Portland cement, potassium silicate cement, or aluminum silicate cement;
    forming an initial carbonaceous bed by a quantity of particles in which at least about 25% of the carbon content of the initial bed is provided by said quantity of non-coke units and up to about 75% of the carbon content of the initial bed is provided by particles of coke; and
    performing a pyrolytic process with the carbonaceous bed including reacting carbon in the bed with other added process material at an elevated temperature.

2. The process of claim 1, wherein:
    the forming of the plurality of the non-coke units comprises mixing dry ingredients of the bricks to form a dry mix; adding water at a weight ratio about one part water to two parts dry mix; and allowing the resulting mixture to set up and air dry.

3. The process of claim 2, wherein:
the forming of the plurality of the non-coke units is followed by either or both of some drying and charring of the surface of at least some of the non-coke units prior to placing in a reactor vessel.

4. The process of claim 1, wherein:
the performing of the pyrolytic process is carried out in a reactor vessel in which the elevated temperature in the bed is produced by injecting a plasma heated gas into the bed or the bed is initially activated to produce the elevated temperature by ignition of a fuel; and
the process further comprises supplementing of carbon material during the performing of the pyrolytic process includes adding carbon material along with or interspersed with added process material on top of the initial bed.

5. The process of claim 4, wherein:
the forming of the initial carbonaceous bed includes at least about 50% of the carbon content of the initial carbonaceous bed being the non-coke units and up to about 50% of the carbon content of the initial carbonaceous bed provided by said quantity of coke; and
the process material added to the bed includes at least about 50% by weight of biomass material.

6. The process of claim 4, wherein:
the supplementing of carbon material further includes the injecting of carbon-containing fines into the carbonaceous bed.

7. The process of claim 1, wherein the bricks have a material composition including, in approximate weight % other than water:
carbon containing particles, 40 to 95 parts,
silica, 0 to 30 parts,
calcium carbonate, 0 to 25 parts,
fly ash 0 to 40 parts,
Portland cement, 0 to 20 parts,
potassium silicate cement, 0 to 20 parts,
aluminum silicate cement, 0 to 20 parts,
kaolin clay, 0 to 20 parts,
sodium bentonite, 0 to 20 parts,
calcium bentonite, 0 to 20 parts,
potassium bentonite, 0 to 20 parts,
sodium silicate, 0 to 20 parts
aluminum hydroxide, 0 to 10 parts,
nickel, 0 to 5 parts, and
iron, 0 to 5 parts.

8. The process of claim 7, further comprising the steps of:
mixing the material composition with an amount of water to form a moldable mixture;
pouring the moldable mixture into the molds of a predetermined size and shape for use in a carbonaceous bed; and
allowing the moldable mixture, in the molds, to set and air dry.

9. The process of claim 8, further including formation of the carbonaceous bed by including the steps of:
removing the molded units from the molds, which are shaped to provide the units with average dimensions of about 10 cm to 25 cm across, and
introducing a quantity of the molded units into a reactor vessel to form the carbonaceous bed in which at least about 25% of the carbonaceous bed carbon content is carbon of the molded units.

10. The process of claim 1, wherein:
the bricks further comprise one or more of bentonite clay, sand, sodium silicate, and aluminum hydroxide.

11. The process of claim 1, wherein:
the carbon containing particulate material comprises a non-reacted byproduct of a pyrolytic process using carbon either in the presence of or the absence of a plasma.

12. The process of claim 1, wherein:
the carbon containing particulate material comprises a non-reacted byproduct of a combustion process using carbon.

13. The process of claim 1, wherein the bricks comprise:
between 40% and 60% of the carbon containing particulate material by weight.

14. The process of claim 1, wherein the carbon containing particulate material comprises:
spent pot liner.

15. The process of claim 1, wherein the carbon containing particulate material comprises:
fly ash.

16. The process of claim 1, wherein the carbon containing particulate material comprises:
wood particles.

17. The process of claim 1, wherein the carbon containing particulate material comprises:
biomass.

18. The process of claim 1, wherein the added process material comprises:
municipal solid waste.

19. The process of claim 1, wherein:
the forming of the plurality of the non-coke units comprises mixing dry ingredients of the bricks to form a dry mix; adding sufficient water to allow cement hydration; and allowing the resulting mixture to set up and air dry.

* * * * *